(12) United States Patent
Kalasapur et al.

(10) Patent No.: US 8,161,397 B2
(45) Date of Patent: Apr. 17, 2012

(54) INTERACTION BETWEEN REAL-WORLD DIGITAL ENVIRONMENTS AND VIRTUAL WORLDS

(75) Inventors: Swaroop Kalasapur, Santa Clara, CA (US); Yu Song, Pleasanton, CA (US); Doreen Cheng, San Jose, CA (US); Sangoh Jeong, Palo Alto, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 822 days.

(21) Appl. No.: 12/134,132

(22) Filed: Jun. 5, 2008

(65) Prior Publication Data

US 2009/0307608 A1  Dec. 10, 2009

(51) Int. Cl.
*G06F 3/048* (2006.01)
(52) U.S. Cl. ........................................ 715/757
(58) Field of Classification Search .......... 715/738, 715/748, 757, 750, 839
See application file for complete search history.

(56) References Cited

U.S. PATENT DOCUMENTS

| 6,219,045 | B1 | 4/2001 | Leahy et al. | |
|---|---|---|---|---|
| 7,075,550 | B2* | 7/2006 | Bonadio | 345/589 |
| 7,103,834 | B1* | 9/2006 | Humpleman et al. | 715/205 |
| 7,843,471 | B2* | 11/2010 | Doan et al. | 345/633 |
| 2002/0184304 | A1* | 12/2002 | Meade et al. | 709/203 |
| 2008/0146342 | A1* | 6/2008 | Harvey et al. | 463/42 |
| 2011/0087976 | A1* | 4/2011 | Cisler et al. | 715/762 |

* cited by examiner

*Primary Examiner* — Thanh Vu
(74) *Attorney, Agent, or Firm* — Beyer Law Group LLP (57) ABSTRACT

In one embodiment, a method for operating a local virtual world proxy is provided. A virtual world view is received corresponding to a virtual world client. Information about resources available to the virtual world client is obtained. Virtual representations of one or more resources available to a virtual world client are fetched. Then the virtual representations are injected into the virtual world view. The virtual world view is then forwarded to the virtual world client for display to a user of the virtual world client.

23 Claims, 5 Drawing Sheets

INTERACTION BETWEEN REAL-WORLD DIGITAL ENVIRONMENTS AND VIRTUAL WORLDS

BACKGROUND OF THE INVENTION

1. Field of the Invention

The present invention relates to virtual worlds. More particularly, the present invention relates to the interaction between real-world digital environments and virtual worlds.

2. Description of the Related Art

Virtual Worlds are computer-based simulations wherein multiple users interact with each other and with objects within the world via a graphical user interface. Users of the virtual world may be interconnected via the Internet and/or other communications mediums and protocols, such as Voice over IP (VoIP).

In a virtual world, a user is typically represented by an avatar, or a virtual representation of the user. This avatar typically takes the form of a semi-realistic being, such as a human or animal, which the user can control using various navigational commands. Through the control of this avatar, the user can interact with other users and perform actions within the world, such as fighting, picking up objects, and using objects, among many others.

Figure 1:
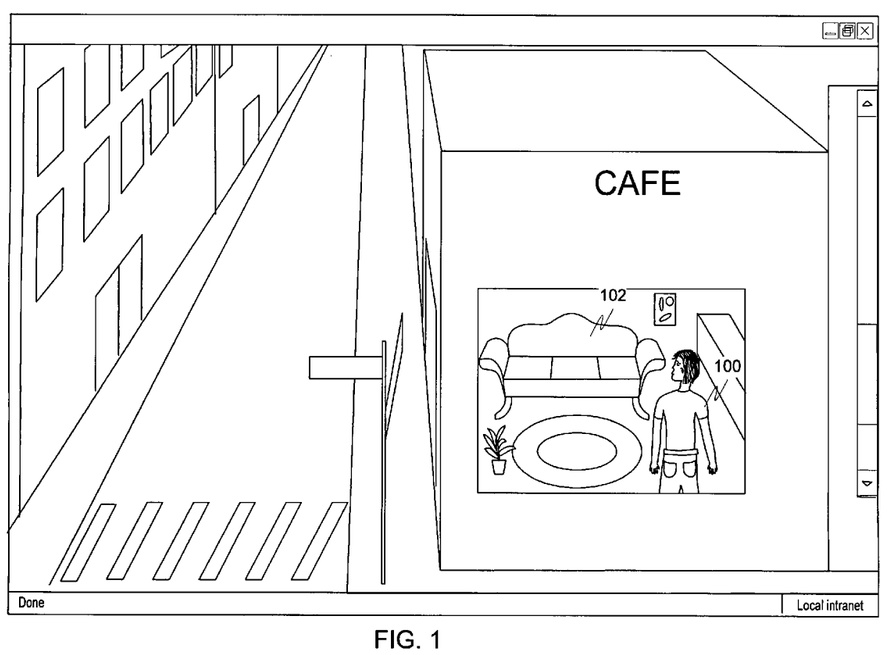
FIG. 1 is a screen capture of an example virtual world.

FIG. 1 is a screen capture of an example virtual world. Here, a user's avatar 100 has encountered an object 102.

Virtual worlds have become very popular in recent years, and are increasingly used for various purposes including entertainment, training, collaborative work, etc.

One perception of virtual worlds requires an online persistent world, active and available 24 hours a day and seven days a week, to qualify as a true virtual world. Although this is possible with smaller virtual worlds, it is often impractical for a virtual world to run all day, every day. Virtual worlds must include downtime for maintenance that is not included as time passing in the virtual world. While the interaction with other participants is done in real-time, time consistency is not always maintained in online virtual worlds. For example, EverQuest time passes faster than real-time despite using the same calendar and time units to present game time.

Virtual worlds can generally be divided along a spectrum ranging from massively multiplayer online role-playing games (MMORPGs), where the user playing a specific character is a main feature of the game (World Of Warcraft, for example), and massively multiplayer online real-life/roguelike games (MMORLGs), where the user can edit and alter their avatar at will, allowing them to play a more dynamic role, or multiple roles.

Some would argue that the MMO versions of other games are also virtual worlds if the world editors, such as GtkRadiant allow for open editing of the terrains if the "source file" for the terrain is shared. Emerging concepts include basing the terrain of such games on real satellite photos, such as those available through the Google Maps API or through a simple virtual geocaching of "easter eggs" on WikiMapia, where permitted.

Virtual worlds are well-known as being fantasy spaces sealed off from the real world, but more careful analysis reveals that the boundaries between the real and virtual worlds is quite porous. Participants constantly arrive and depart from the world, carrying with them their unique set of behavioral assumptions and attitudes that cannot be disentangled from their interactions in the virtual world.

For example, in virtual worlds which bring together players from multiple cultural backgrounds, a participant in a virtual world brings their own cultural preconceptions about those other cultures across the boundary into the world while playing. The term magic circle has been used to describe the imaginary barrier between the virtual world and the real world. The fantasy environment of the virtual world is protected from the intrusion of real life by this magic circle, but practices such as the sale of virtual items and virtual currency for real life currency challenges this separation while reinforcing the notion that objects in the virtual world have real life value.

A virtual economy is the emergent property of the interaction between participants in a virtual world. While the designers have a great deal of control over the economy by the encoded mechanics of trade, it is nonetheless the actions of players that define the economic conditions of a virtual world. The economy arises as a result of the choices that players make under the scarcity of real and virtual resources such as time or currency. Participants have a limited time in the virtual world, as in the real world, which they must divide between tasks such as collecting resources, practicing trade skills, or engaging in less productive game play. The choices they make in their interaction with the virtual world, along with the mechanics of trade and wealth acquisition, dictate the relative values of items in the economy. The economy in virtual worlds is typically driven by in-game needs such as equipment, food, or trade goods.

The value of objects in a virtual economy is usually linked to their usefulness and the difficulty of obtaining them. The investment of real world resources (time, membership fees, etc) in acquisition of wealth in a virtual economy may contribute to the real world value of virtual objects. This real world value is made obvious by the trade of virtual items on online market sites like eBay.

Furthermore, economics can be injected into virtual worlds indirectly by the inclusion of advertising into the 3D environment.

Businesses no longer only compete in the real world, they also compete in virtual worlds. As there has been an increase in the buying and selling of products online (e-commerce), this combined with the rise in the popularity of the Internet has forced businesses to adjust to accommodate the new market.

Many companies and organizations now incorporate virtual worlds as a new form of advertising. There are many advantages to using these methods of commercialization. An example of this would be Apple creating an online store within "Second Life". This allows the users to browse the latest and innovative products. Using virtual worlds also gives companies the opportunity to gauge customer reaction and receive feedback. Feedback can be crucial to the development of a project as it will inform the creators exactly what users want.

Another use of virtual worlds in business is as a virtual gathering place. Many businesses can now be involved in business-to-business commercial activity and will create a specific area within a virtual world to carry out their business. This can be useful for a variety of reasons. Business can be conducted with companies on the other side of the world, so there are no geographical limitations. It can also increase company productivity, since knowing that there is an area where help is readily available, or ideas can be easily exchanged, can aid the employees.

Virtual worlds also represent a powerful new medium for instruction and education. Persistence allows for continuing and growing social interactions, which themselves can serve as a basis for collaborative education. The use of virtual worlds can give teachers the opportunity to have a greater level of student participation. It allows users to be able to carry out tasks that could be difficult in the real world due to constraints and restrictions, such as cost, scheduling or location. Indeed, entire schools could be created in a virtual world, allowing students in rural areas to gain access to the benefits of interacting with people from other geographic areas and also to allow for a more diverse student population.

Virtual worlds have the capability to adapt and grow to different user needs. They can be a good source of user feedback, the typical paper-based resources have limitations that Virtual Worlds can overcome.

Virtual worlds allow users with specific needs and requirements to be able to access and use the same learning materials from home, as they would be receiving if they were in a presentation. This can help users to keep up to date with the relevant information and needs while also feeling as though involved. Having the option to be able to attend a presentation via a virtual world from home or work can help the user to be more comfortable. The flexibility of virtual worlds has greatly improved the options for student study and business collaboration.

Even non-profit businesses can benefit from the use of a virtual world. A museum could, for example, recreate its exhibits in a virtual world and open up its benefits to people who are unable to travel to the museum. An art museum, for example, could allow for high-definition images of paintings to be viewed online as users walk through a virtual version of the museum.

As can be seen, the bounds of virtual worlds are limited only by a creator's imagination.

SUMMARY OF THE INVENTION

In one embodiment, a method for operating a local virtual world proxy is provided. A virtual world view is received corresponding to a virtual world client. Information about resources available to the virtual world client is obtained. Virtual representations of one or more resources available to a virtual world client are fetched. Then the virtual representations are injected into the virtual world view. The virtual world view is then forwarded to the virtual world client for display to a user of the virtual world client.

In another embodiment, a system is provided comprising: a local virtual world proxy, wherein the local virtual world proxy includes: a resource manager; a mirror manager coupled to the resource manager; a protocol library coupled to the mirror manager; a model library coupled to the mirror manager; and a visualization manager coupled to the resource manager, the mirror manager, and the model library.

In another embodiment, a local virtual world proxy is provided comprising: means for receiving a virtual world view corresponding to a virtual world client; means for obtaining information about resources available to the virtual world client; means for fetching virtual representations of one or more resources available to a virtual world client; means for injecting the virtual representations into the virtual world view; and means for forwarding the virtual world view to the virtual world client for display to a user of the virtual world client.

In another embodiment, a program storage device readable by a machine tangibly embodying a program of instructions executable by the machine to perform a method for operating a local virtual world proxy is provided, the method comprising: receiving a virtual world view corresponding to a virtual world client; obtaining information about resources available to the virtual world client; fetching virtual representations of one or more resources available to a virtual world client; injecting the virtual representations into the virtual world view; and forwarding the virtual world view to the virtual world client for display to a user of the virtual world client.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, a user's digital environment is mirrored into a virtual world in real-time. The user is then able to use a mirrored virtual world object to affect the corresponding real-world object. Such mirroring can provide intuitive visual cues to the user about the capabilities of their physical environment, and enables easy and intuitive utilization of the capabilities of the resources in the environment.

Embodiments of the present invention provide for the automatic and dynamic sensing of the resources in the environment surrounding a user device, such as, for example, a mobile device.

Embodiments of the present invention also provide for automatic and dynamic code generation for operations on mirrored virtual world objects to control and/or affect real-world objects.

Embodiments of the present invention also bring real-world objects into a virtual world in an automatic and/or assisted way. Specifically, if a real-world object does not have a pre-built virtual presence, some of the functionality can be abstracted to provide a presence for such an object in the virtual world.

An embodiment of the present invention utilizes service and device discovery to automatically discover a user's digital environment. Service discovery may be enabled using a variety of different technologies, such as Universal Plug and Play (UPnP).

Figure 2:
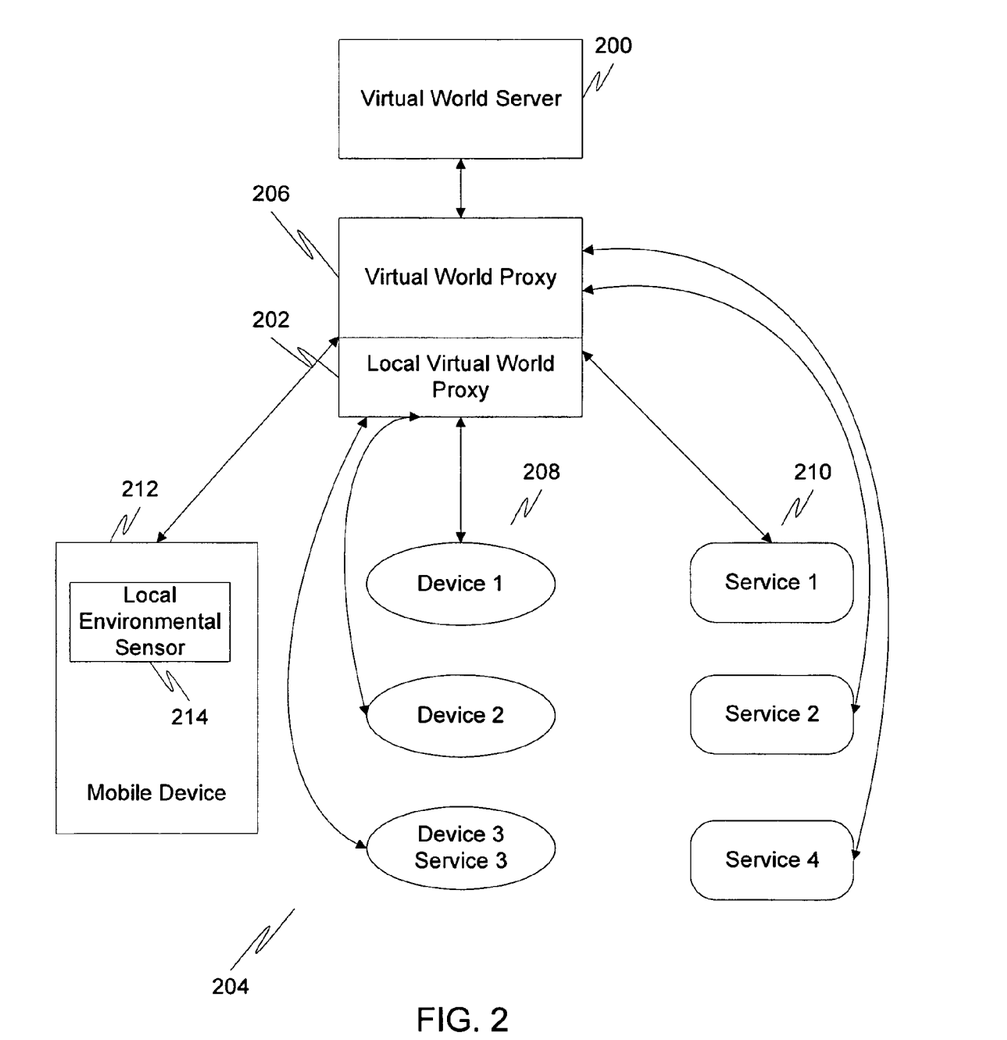
FIG. 2 is a diagram illustrating a high level overview of an example embodiment of the present invention.

FIG. 2 is a diagram illustrating a high level overview of an example embodiment of the present invention. This general architecture may run on top of existing virtual world systems, although the invention is not limited by such systems.

A virtual world server 200 is an external entity that acts as a virtual world host. The entire virtual world environment may be controlled at the server, including the look and feel of the environment, access to multiple virtual spaces, etc.

The local virtual world proxy 202 is an entity that acts as a mediator between local virtual world clients 204 and a virtual world server 200. The local virtual world proxy 202 contains a virtual world proxy 206 that is compatible with a chosen virtual world system. The virtual world proxy 206 is capable of acting on the interaction between the virtual world client and the virtual world server. The virtual world proxy 206 can filter information traveling between the client and the virtual world server by taking away some details or by injecting new details. This feature of injection and removal of virtual world entities is used to accomplish some of the aims of the present invention.

In addition to a virtual world proxy 206, the local virtual world proxy 202 is also capable of interacting with the local physical environment. It has the capability to hold the knowledge about the local environment including the presence of local resources. This knowledge can be obtained in multiple ways. The entities 208, 210 within the local environment can publish their information to the local virtual world proxy, or the local virtual world proxy can fetch such information from a dedicated service such as the local DNS, or a service registry, or through using a protocol such as UPnP.

There are multiple devices and services 208, 210 (collectively known as resources) within the environment, which form the knowledge base within the local virtual world proxy. Each resource has one or more features that can be accessed over the network. The information that is registered at the local virtual world proxy is sufficient to use such features.

Along with the above-stated resources, there are multiple devices 202 carried by various users within the local environment. Each of these devices has information and/or capabilities that can be useful over the network.

A user device 202 such as a mobile device, for example, may be equipped with a virtual world client 212 that is capable of displaying the virtual world environment and also allowing users to interact with the virtual world. Along with the virtual world client, the user device also has the capability to sense the local environment through popular mechanism such as Bluetooth, WiFi, UPnP, etc using a local environmental sensor 214.

Figure 3:
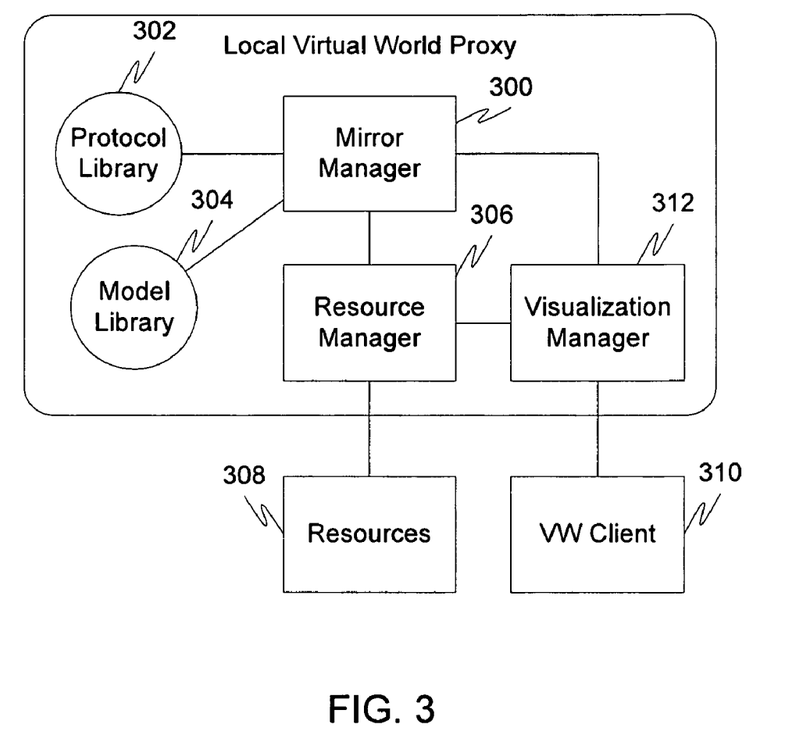
FIG. 3 is a component diagram illustrating a local virtual world proxy in accordance with an embodiment of the present invention.

FIG. 3 is a component diagram illustrating a local virtual world proxy in accordance with an embodiment of the present invention. This depicts local virtual world proxy 204 of FIG. 2 in more detail. A mirror manager 300 is responsible for managing the translation of real-world resource capabilities into their virtual world counterparts.

A protocol library 302 is a store containing the details necessary for the mirror manager 300 to convert the capabilities of real world resources (as expressed through their service descriptions) into virtual world scripts that would enable a real-world object to be interacted within the virtual world. A model library 304 is a store for real-world objects. The resource manager 306 is responsible for all the interactions with resources 308 over the network. It collects information about the available resources such as the service descriptions, resource descriptions, etc. The information collected is sent to the mirror manager 300.

The primary responsibility of the mirror manager 300 is to inject the virtual objects into the virtual world client 310. The client 310 sends information about the resources visible to itself (through its local environment sensor) to the local virtual world proxy. A visualization manager 312 uses this information to inject only those virtual resources into the corresponding client 310. The information presented to the client 310 need not be limited to only those visible to itself. The visualization manager 312 may inject other virtual resources into the client 310, based on the application/implementation.

When the client 310 performs any operations on the virtual objects, these interactions are reported back to the local virtual world proxy. These operations are then sent to the resource manager, which then relays that back to the corresponding physical resource.

The virtual world proxy also filters out information related to the local resources from going into the virtual world server, keeping the real world integration local.

Additional capabilities may be added to provide security of the real-world resources. For example, in some embodiments, it may be preferable to limit access to certain resources to certain people. The local virtual world proxy can manage such security associations, or may interact with another device, such as an Authentication, Authorization, and Accounting (AAA) server, to provide such services.

Any number of security protocols may be used to ensure the secured access of the local resources. In one example, a user name and password may be required in order to access a resource. In another example, a security certificate may be required in order to access a resource. In another example, a security key may be required in order to access a resource.

Furthermore, additional embodiments may permit different virtual world object representations for the same resource when viewed by different users. For example, embodiments are possible wherein when one user views a local printer the printer is colored red, while when another user views a local printer the printer is colored green. This differentiation may be done for many different reasons. For example, it may be preferable to label certain resources that are "off limits" as red (in lieu of hiding them entirely). Another reason may simply to offer more appealing colors to resources that are "preferred" for the particular user. For example, in an office digital environment, a user may be able to access any printer in the virtual office, but it may be preferably to color the printer that is closest to his physical location as something different than the color of a remote printer, to encourage the user to print to the closest printer.

Another reason to vary colors of resources among users is simply to provide a more appealing virtual world appearance for the user. Some users, for example, may express a preference for certain color schemes. While one user might prefer that printers in his environment be blue, another user might prefer they be yellow. The local virtual world proxy is capable of managing such combinations.

Furthermore, while appearance is described above in terms of color, any number of visual characteristics of the object may be altered from user-to-user. Size, shape, shading, etc. are all possibly alterable visual characteristics.

An additional embodiment is conceived where the invention is integrated into an existing service discovery mechanism. Such an embodiment would not require that the virtual world client contain a local environmental sensor. Users can interact with presented service through their virtual world environments, even though their own devices have no new service discovery features.

In another embodiment of the present invention, a proposed visual representation of a resource may first be sent to the user for approval. The user is able to accept or reject the proposed visual representation. In cases of a rejection, the system may select another possible visual representation to the user. This process may continue until the user finds a virtual representation to his or her liking. Alternatively, the user could upload or create his own virtual representation for the resource.

Figure 4:
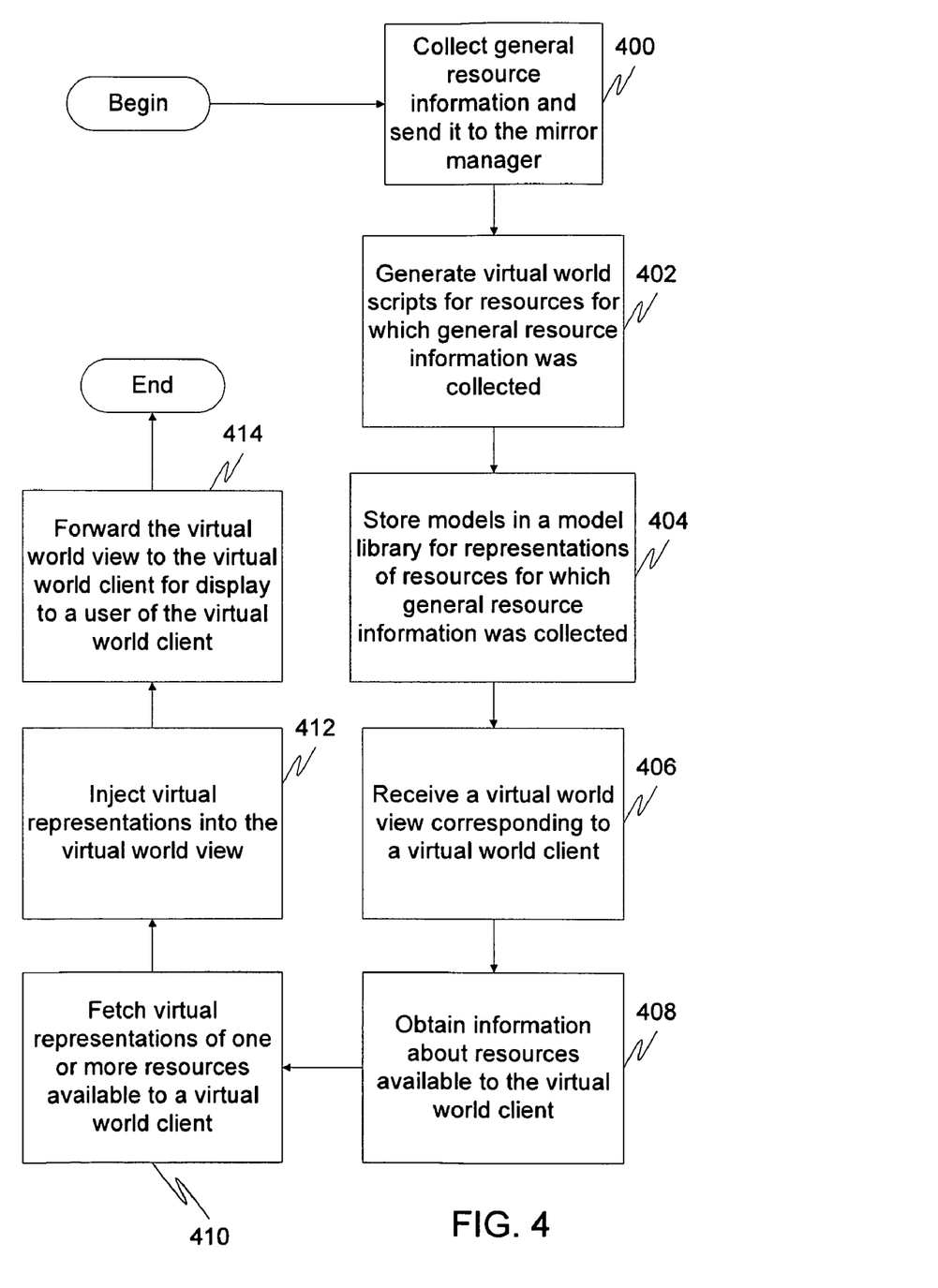
FIG. 4 is a flow diagram illustrating a method for operating a local virtual world proxy in accordance with an embodiment of the present invention.

FIG. 4 is a flow diagram illustrating a method for operating a local virtual world proxy in accordance with an embodiment of the present invention. Each step of the method may be performed in hardware, software or any combination thereof. At 400, general resource information may be collected and sent to a mirror manager. At 402, virtual world scripts may be generated for resources for which general resource information was collected. This may include accessing a protocol library, wherein the protocol library includes information as to how to convert capabilities of real-life resources into virtual world scripts. The capabilities may be expressed through service descriptions. At 404, models for representations of resources for which general resource information was collected may be stored in a model library. At 406, a virtual world view corresponding to a virtual world client is received. This may be received from a virtual world server. At 408, information about resources available to the virtual world client may be obtained. This may be information generated by a local environmental sensor of the virtual world client. At 410, virtual representations of one or more resources available to a virtual world client are fetched. At 412, virtual representations are injected into the virtual world view. At 414, the virtual world view is forwarded to the virtual world client for display to a user of the virtual world client.

Figure 5:
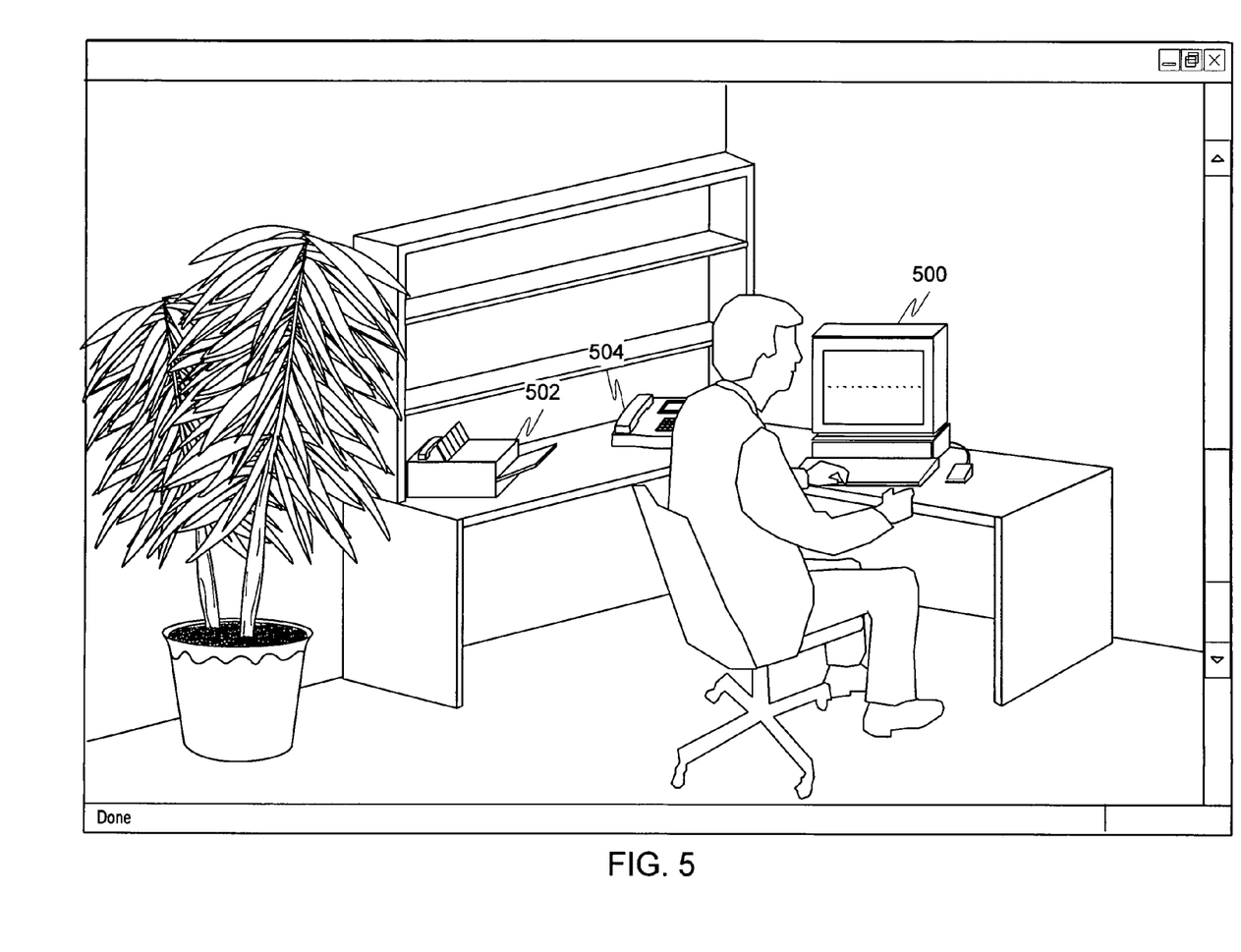
FIG. 5 is a screen capture of a virtual world in accordance with an embodiment of the present invention.

FIG. 5 is a screen capture of a virtual world in accordance with an embodiment of the present invention. While not pictured, the user's real life office may contain a computer, a printer, a fax machine, and a telephone. FIG. 5 depicts the virtual world representation of the office, complete with computer 500, printer 502, and telephone 504. The devices 500-504 may be depicted using virtual representations stored in the model library. Users of the virtual world may interact with the devices 500-504 because the capabilities of the real life resources have been converted into virtual world scripts (of course, as described above, there may be some objects that, for one reason or another, do not permit user interaction— these devices may still have virtual world scripts if at some point some user can interact with them via the virtual world).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for operating a local virtual world proxy, the method comprising:

receiving a virtual world view, wherein the virtual world view is a graphical interface allowing a user to interact with objects by controlling an avatar representation of the user from within the virtual world view, wherein the virtual world view corresponds to a virtual world client;

obtaining information about a real world digital resource available to the virtual world client, wherein the obtaining information includes discovering a digital service that is communicatively coupled to the virtual world client such that there is two-way communication between the real world digital resource and the virtual world client, wherein the real world digital resource has not been previously associated with a virtual world script for the virtual world view, and wherein the real world digital resource does not have an associated three dimensional image corresponding to the real world digital resource in particular;

accessing a protocol library to determine a virtual world script that would best represent the real world digital resource with respect to protocols and procedures used to access the real world digital resource;

fetching a virtual representation corresponding to the determined virtual world scrip;

injecting the virtual representation into the virtual world view, such that the user can control the real world digital resource by controlling the user's avatar to interact virtually with the virtual representation from within the virtual world view; and forwarding the virtual world view to the virtual world client for display to a user of the virtual world client.

2. The method of claim 1, wherein the receiving includes receiving a virtual world view from a virtual world server.

3. The method of claim 1, wherein the information about the real world digital resources available to the virtual world client was generated by a local environmental sensor of the virtual world client.

4. The method of claim 1, further comprising:

collecting general resource information and sending the general resource information to a mirror manager.

5. The method of claim 4, further comprising, at the mirror manager:

generating virtual world scripts for resources for which general resource information was collected.

6. The method of claim 5, wherein the generating further comprises:

accessing a protocol library, wherein the protocol library includes information as to how to automatically convert capabilities of real-life resources into virtual world scripts when the real-life resources have not been previously associated with a virtual world script.

7. The method of claim 6, wherein the capabilities of real-life resources are expressed through service descriptions.

8. The method of claim 4, further comprising:

storing models, in a model library, for visual representations of resources for which general resource information was collected.

9. The method of claim 1, wherein the virtual representation includes scripts allowing a user to cause a change to occur in the real world resources through the virtual world.

10. The method of claim 1, further comprising managing security associations for the virtual representation such that some users of the virtual world are limited in their ability to interact with certain virtual representations.

11. The method of claim 1, further comprising providing different virtual representations for the same real-world resource for different users of the virtual world.

12. The method of claim 11, wherein the different virtual representations include different colors representing different permissions for different users to utilize the same real-world resource.

13. The method of claim 11, wherein the different virtual representations include different colors representing different preference levels for different users for the same real-world resource.

14. The method of claim 11, wherein the different virtual representations include different colors representing different distances for different users from the same real-world resource.

15. The method of claim 11, wherein the different virtual representations include different colors for the same real-world resource for different users based on users' preferred color schemes.

16. A system comprising:
   a local virtual world proxy located on an electronic device, wherein the local virtual world proxy includes:
      a resource manager configured to obtain information about a real world digital resource available to a virtual world client, wherein the obtaining information includes discovering a digital service that is communicatively coupled to the virtual world client such that there is two-way communication between the real world digital resource and the virtual world client, wherein the real world digital resource has not been previously associated with a virtual world script for the virtual world view, and wherein the real world digital resource does not have an associated three dimensional image corresponding to the real world digital resource in particular;
      a minor manager coupled to the resource manager;
      a protocol library coupled to the mirror manager;
      a model library coupled to the mirror manager; and
      a visualization manager coupled to the resource manager, the mirror manager, and the model library, wherein the visualization manager is configured to receive a virtual world view, wherein the virtual world view is a graphical interface allowing a user to interact with objects by controlling an avatar representation of the user from within the virtual world view, access the protocol library to determine a virtual world script that would best represent the real world digital resource with respect to protocols and procedures used to access the real world digital resource, fetch a virtual representation corresponding to the determined virtual world script from the model library, inject the virtual representation into the virtual world view using the protocol library, such that a user can control the real world digital resource by controlling the user's avatar to interact virtually with the virtual representation from within the virtual world view, and forward the virtual world view to the virtual world client for display to a user of the virtual world client.

17. The system of claim 16, wherein the resource manager is configured to collect resource information and send the general resource information to a mirror manager.

18. The system of claim 17, wherein the mirror manager is configured to:
   generate virtual world scripts for resources for which generate resource information was collected by accessing the protocol library;
   wherein the protocol library includes information as to how to convert capabilities of real-life resource into a virtual world scripts; and
   store models, in the model library, for visual representations of resources for which general resource information was collected.

19. The system of claim 16, wherein the visualization manager is configured to:
   receive a virtual world view corresponding to a virtual world client;
   obtain information about resources available to the virtual world client;
   fetch virtual representations of one or more resources available to a virtual world client;
   inject the virtual representations into the virtual world view; and
   forward the virtual world view to the virtual world client for display to a user of the virtual world client.

20. The system of claim 16, further comprising a virtual world server.

21. The system of claim 16, further comprising one or more mobile devices.

22. A local virtual world proxy located on an electronic device comprising:
   means for receiving a virtual world view, wherein the virtual world view is a graphical interface allowing a user to interact with objects by controlling an avatar representation of the user from within the virtual world view, wherein the virtual world view corresponds to a virtual world client;
   means for obtaining information about a real world digital resource available to the virtual world client, wherein the obtaining information includes discovering a digital service that is communicatively coupled to the virtual world client such that there is two-way communication between the real world digital resource and the virtual world client, wherein the real world digital resource has not been previously associated with a virtual world script for the virtual world view, and wherein the real world digital resource does not have an associated three dimensional image corresponding to the real world digital resource in particular;
   means for accessing a protocol library to determine a virtual world script that would best represent the real world digital resource with respect to protocols and procedures used to access the real world digital resource;
   means for fetching a virtual representation corresponding to the determined virtual world scrip;
   means for injecting the virtual representation into the virtual world view, such that the user can control the real world digital resource by controlling the user's avatar to interact virtually with the virtual representation from within the virtual world view; and
   means for forwarding the virtual world view to the virtual world client for display to a user of the virtual world client.

23. A program storage device readable by a machine tangibly embodying a program of instructions executable by the machine to perform a method for operating a local virtual world proxy, the method comprising:
   receiving a virtual world view, wherein the virtual world view is a graphical interface allowing a user to interact with objects by controlling an avatar representation of the user from within the virtual world view, wherein the virtual world view corresponds to a virtual world client;
   obtaining information about a real world digital resource available to the virtual world client, wherein the obtaining information includes discovering a digital service that is communicatively coupled to the virtual world client such that there is two-way communication between the real world digital resource and the virtual world client, wherein the real world digital resource has not been previously associated with a virtual world script for the virtual world view, and wherein the real world digital resource does not have an associated three dimensional image corresponding to the real world digital resource in particular;

accessing a protocol library to determine a virtual world script that would best represent the real world digital resource with respect to protocols and procedures used to access the real world digital resource;

fetching a virtual representation corresponding to the determined virtual world scrip;

injecting the virtual representation into the virtual world view, such that the user can control the real world digital resource by controlling the user's avatar to interact virtually with the virtual representation from within the virtual world view; and forwarding the virtual world view to the virtual world client for display to a user of the virtual world client.

* * * * *